United States Patent
Lee et al.

(10) Patent No.: US 7,215,953 B2
(45) Date of Patent: May 8, 2007

(54) PRIVATE WIRELESS HIGH-SPEED DATA SYSTEM AND DATA SERVICE METHOD

(75) Inventors: Jun-Hyuk Lee, Suwon-si (KR); Soo-Hwan Kim, Gyeonggi-do (KR); Doo-Yong Yang, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 67 days.

(21) Appl. No.: 10/826,413

(22) Filed: Apr. 19, 2004

(65) Prior Publication Data

US 2004/0219913 A1 Nov. 4, 2004

(51) Int. Cl.
*H04Q 7/20* (2006.01)
(52) U.S. Cl. .................... 455/426.1; 370/338
(58) Field of Classification Search ........... 455/425, 455/426.1, 435.1, 422.1, 410, 445; 370/395.3, 370/352, 338, 348; 709/228
See application file for complete search history.

(56) References Cited

U.S. PATENT DOCUMENTS

| | | | |
|---|---|---|---|
| 6,687,243 B1 | 2/2004 | Sayers et al. | |
| 6,697,621 B2 | 2/2004 | Taha et al. | |
| 6,704,569 B2 | 3/2004 | Larson | |
| 2003/0069013 A1 | 4/2003 | Lee et al. | |
| 2003/0078047 A1 | 4/2003 | Lee et al. | |
| 2003/0135626 A1* | 7/2003 | Ray et al. | 709/228 |
| 2003/0186694 A1* | 10/2003 | Sayers et al. | 455/426.1 |
| 2003/0223427 A1* | 12/2003 | Chang et al. | 370/395.3 |
| 2004/0048601 A1 | 3/2004 | Lee et al. | |
| 2004/0048610 A1* | 3/2004 | Kim et al. | 455/422.1 |
| 2004/0203771 A1* | 10/2004 | Chang et al. | 455/435.1 |
| 2005/0059390 A1* | 3/2005 | Sayers et al. | 455/425 |
| 2005/0088999 A1* | 4/2005 | Waylett et al. | 370/338 |
| 2005/0207395 A1* | 9/2005 | Mohammed | 370/352 |

FOREIGN PATENT DOCUMENTS

| | | |
|---|---|---|
| JP | 08-214358 | 8/1996 |
| WO | WO 03/005607 | 1/2003 |

OTHER PUBLICATIONS

Japanese Office Action of the Japanese Patent Application No. 2004-132271, issued on Jun. 20, 2006.

* cited by examiner

Primary Examiner—Duc M. Nguyen
Assistant Examiner—Michael Vu
(74) Attorney, Agent, or Firm—Robert E. Bushnell, Esq.

(57) ABSTRACT

In a private wireless high-speed data system and data service method, a private pDLR for handling authentication of a terminal entering a private network and call processing is arranged in a private (premises) EV-DO wireless network and session information of the corresponding terminal is received from a data location register (DLR) of the public EV-DO network and is stored in a database of the private pDLR only when the terminal entering the private EV-DO wireless network requests the call connection for the first time, and the call authentication is performed. The call processing is performed using the session information for the corresponding terminal stored in the private pDLR in when the call connection is requested from the terminal entering the private network at least two or more times.

17 Claims, 5 Drawing Sheets

FIG. 4

| FUNCTION | PUBLIC NETWORK DLR | PRIVATE NETWORK DLR |
|---|---|---|
| 1. FUNCTION OF SESSION GENERATION AND CANCELLATION | O | X |
| 2. FUNCTION OF UATI ENDOWMENT AND CANCELLATION | O | X |
| 3. WHETHER ITS OWN DB IS POSSESSED | O | O |
| 4. FUNCTION OF SESSION MAINTENANCE CONFIRMATION | O | X |
| 5. FUNCTION OF PAGING INSTRUCTION TRANSMISSION | O | O |
| 6. FUNCTION OF INTERFACING WITH ADJACENT DLR | O | X |

PRIVATE WIRELESS HIGH-SPEED DATA SYSTEM AND DATA SERVICE METHOD

CLAIM OF PRIORITY AND CROSS-REFERENCE TO RELATED APPLICATIONS

This application makes reference to, incorporates the same herein, and claims all benefits accruing under 35 U.S.C. §119 from an application for PRIVATE WIRELESS HIGH-SPEED DATA SYSTEM AND DATA SERVICE METHOD USING THE SAME earlier filed in the Korean Intellectual Property Office on 29 Apr. 2003 and there duly assigned Ser. No. 2003-27335.

Furthermore, the present application is related to two co-pending U.S. applications, Ser. No. (to be determined), entitled PERFORMING TERMINAL AUTHENTICATION AND CALL PROCESSING IN PRIVATE WIRELESS HIGH-SPEED DATA SYSTEM, based upon Korean Patent Application Serial No. 2003-27343 filed in the Korean Intellectual Property Office on 29 Apr. 2003, and filed in the U.S. Patent & Trademark Office concurrently with the present application, and Serial No. (To be determined), entitled PRIVATE EV-DO SYSTEM SHARING PUBLIC NETWORK DATA LOCATION REGISTER AND DATA SERVICE METHOD, based upon Korean Patent Application Serial No. 2003-27342 filed in the Korean Intellectual Property Office on 29 Apr. 2003, and filed in the U.S. Patent & Trademark Office concurrently with the present application.

BACKGROUND OF THE INVENTION

1. Field of the Invention

The present invention is related to a private wireless high-speed data system and a data service method and, more specifically, to a private wireless high-speed data system and a data service method, wherein a public EV-DO wireless network and a private (premises) EV-DO wireless network are simultaneously serviced using a wireless terminal of a wireless high-speed data system (CDMA 1×EV-DO).

2. Description of the Related Art

Generally, a CDMA 1×EV-DO (hereinafter, referred to as EV-DO) wireless network uses a new packet wireless data transmission technology developed using CDMA technology by Qualcomm, which allows mega class high-speed data transmission. The EV-DO wireless network has a maximum transmission speed of 2.4 Mbps in a forward direction and 307.2 Kbps in a backward direction, which is the same transmission speed as that of an asymmetric digital subscriber line (ADSL) scheme used in a wired network.

EV-DO is being developed because the 1×RTT system of an IMT-2000 MC (Multi-Carrier; synchronous) system, which support both voice and data and has been tested for commercial use, has a high-speed data transmission bandwidth limit of 1.25 MHz and does not support a data transmission speed of 144 Kbps or more in an IS-95 scheme. That is, EV-DO is a supplementary solution for high-speed data transmission.

EV-DO provides a connection to the data dedicated Internet over a data core network (DCN) in an existing IS-95 network. It can support the same data transmission speed as an existing network, even a third generation (3G) network.

EV-DO has an average forward transmission speed allowing a high-speed data communication of several hundred kbps. The radio frequency bandwidth is 1.25 MHz, which is the same as a mobile phone used in a current CDMA One. Considering that a bandwidth of 5 MHz is required to provide 384 bps service in IMT-2000, EV-DO has an improved high frequency usage efficiency.

That is, EV-DO has been designed in a manner suitable for data communication that is not affected by delay when transfer data is burst data as in the Internet, realizing a high-speed transmission with a frequency bandwidth narrower than that of the IMT-2000.

Further, EV-DO performs a function of automatically adjusting the backward transmission speed at a base station side according to the communication quality between a terminal and a base station. This function is realized by monitoring a signal from the terminal received at the base station every 1.67 milliseconds to determine the communication quality and by adjusting data transmission priority and speed with the terminal.

EV-DO improves data communication quality by preferentially increasing transmission speed for a terminal in the vicinity of the base station where electrical interference is less while by reducing communication speed for a terminal located far from the base station.

A typical wireless network is classified into a wireless public network and a wireless private network, which is used at groups, companies, or the like having a particular purpose. The wireless private network is configured to interface with a particular wireless public network. On the other hand, in the above-described EV-DO wireless network, only a public EV-DO wireless network service provided by a mobile communication service provider exists while there is no private EV-DO wireless network service, unlike the typical wireless network.

Thus, methods are being developed which use a part of a public EV-DO wireless network as a private EV-DO wireless network. These methods allow one mobile terminal to be served by the private EV-DO wireless network in a particular region (private region) while being served by the public EV-DO wireless network in other regions.

One of these methods was proposed in Korean Patent Application No. 10-2002-0054625 filed on Sep. 10, 2002 by the present Applicant and entitled "Method and System for Using in Common a Public Network and a Private Network in a Wireless High-speed Data System".

The proposed "Method and System for Using in Common a Public Network and a Private Network in a Wireless High-speed Data System" will be simply discussed. Among methods for implementing a private EV-DO wireless network (private network) in an EV-DO network, the following methods have been suggested therein in configuring a data location register (DLR) and AN_AAA essential to the EV-DO configuration.

First, there is a scheme of handling a private network connection by allowing a direct connection to a public network DLR in order to configure the private network or by disposing a private dedicated DLR in the private network. Further, private authentication is handled by allowing a direct connection to a public network AN_AAA in order to handle private network connection authentication or by disposing a private dedicated AN_AAA in a private network, as in the DLR.

However, although such methods have their own merits, they have the following problems.

First, the method where a public network is shared without a separate private network DLR results in increasing the load on the public network DLR since the mobile communication service provider has to provide private network service. That is, since the terminal used in the private network uses the public network DLR in a private network connection and other steps using the private EV-DO wireless network even though it is registered in the public network, there is a problem in that a public network DLR usage time is increased because of the new service provision.

Since the public network DLR was designed without consideration of the private network service, a problem occurs in that the operation of the public network DLR is greatly affected when the number of private EV-DO wireless networks is significantly increased.

In the second method of installing the private dedicated DLR which has the same function as the public network DLR in the private network, problems occur in that the private terminal cannot respond to a paging request of the public network, the private EV-DO wireless network cannot be connected to the public network, and loads of the public network and the private network DLR are increased due to frequent subnet changes.

Also, in the third method of sharing the public network AN_AAA by arranging the AN_AAA in the private network for the private network authentication and connecting to the public network AN_AAA through the private network AN_AAA, there is a problem in that a dedicated line is needed for connecting the public network AN_AAA to the private network AN_AAA and it is not easy to permit a selective private network connection.

Also, there is a method for managing a private network dedicated AN_AAA to effect private network authentication. However, a problem occurs in that the server installation costs increase since a high performance dedicated AN_AAA server is needed, and the operating cost for managing the server increases.

The following patents each discloses features in common with the present invention but do not teach or suggest the inventive features specifically recited in the present application: U.S. Patent Application No. 2004/0048601 to Lee, entitled METHOD AND SYSTEM FOR USING EITHER PUBLIC OR PRIVATE NETWORKS IN lxev-DO SYSTEM, published on Mar. 11, 2004; U.S. Patent Application No. 2003/0078047 to Lee et al., entitled APPARATUS, METHOD AND SYSTEM FOR MATCHING SUBSCRIBER STATES IN NETWORK IN WHICH PUBLIC LAND MOBILE NETWORK AND WIRED/WIRELESS PRIVATE NETWORK ARE INTERWORKED, published on Apr. 24, 2003; U.S. Patent Application No. 2003/0069013 to Lee et al., entitled APPARATUS, METHOD AND SYSTEM FOR MATCHING SUBSCRIBER STATES IN NETWORK IN WHICH PUBLIC LAND MOBILE NETWORK AND WIRED/WIRELESS PRIVATE NETWORK ARE INTERWORKED, published on Apr. 10, 2003; U.S. Pat. No. 6,704,569 to Larson, entitled CENTRALIZED USER DATABASE AND ADMINISTRATIVE NODE CONNECTING PRIVATE AND PUBLIC WIRELESS COMMUNICATIONS SYSTEMS, issued on Mar. 9, 2004; U.S. Pat. No. 6,697,621 to Taha et al., entitled METHOD AND APPARATUS FOR PROVIDING SERVICES IN A PRIVATE WIRELESS NETWORK, issued on Feb. 24, 2004; and U.S. Pat. No. 6,687,213 to Sayers et al., entitled METHOD AND APPARATUS FOR INTEGRATED WIRELESS COMMUNICATIONS IN PRIVATE AND PUBLIC NETWORK ENVIRONMENTS, issued on Feb. 3, 2004.

SUMMARY OF THE INVENTION

It is, therefore, an object of the present invention to provide a private wireless high-speed data system and a data service method, wherein when there is a first call connection from a DLR arranged in a private network and the private network DLR is coupled to a public network DLR with a dedicated line, session information for processing a call is secured from the public network DLR, the secured session information is stored in the private network DLR, and then the call is processed, and when there is a further call connection from the private network, the private network performs the call processing according to the session information stored in the private network DLR, so that unnecessary loading of the public network DLR can be eliminated.

Also, it is another object of the present invention to provide a private wireless high-speed data system and a data service method, wherein private registration terminal authentication is performed in a private network DLR according to information on a terminal and user's authentication included in session information secured from the public network DLR, without needing a separate AN_AAA for terminal authentication in the private network.

According to an aspect of the present invention, there is provided a private EV-DO wireless network coupled to a public EV-DO wireless network including a data location register adapted to provide private EV-DO wireless data service, a relay unit adapted to relay a corresponding call connection request signal upon the call connection request signal being received from a terminal entering the private EV-DO wireless network; a call processor adapted to generate a session information request signal with respect to the corresponding terminal upon the call connection request signal relayed from the relay unit being a first call connection request signal, and to process a call by assigning a traffic channel to the connection terminal according to the received session information upon the session information corresponding to the requested session information request signal being received; and a session information processor adapted to request a session information request signal of the corresponding terminal generated by the call processor to a public network data location register in the public EV-DO wireless network, to store session information of the corresponding terminal received from the public network data location register, and to provide the call processor with the session information of the corresponding terminal.

Preferably, the session information processor comprises a database adapted to store the session information of the corresponding terminal received from the public network data location register and the session information of the corresponding terminal received from the public network data location comprises authentication information for authenticating the private EV-DO wireless network of the terminal.

Preferably, the session information processor comprises an authentication unit adapted to determine whether the corresponding terminal is a terminal registered in the private EV-DO wireless network using the private EV-DO wireless network authentication information of the terminal included in the session information of the corresponding terminal received from the public network data location register and the session information processor is coupled to a data location register of the public EV-DO wireless network with a dedicated line.

Preferably, the session information processor provides the call processor with the session information of the corresponding terminal stored in the database upon the first call being connected to the database in the session information processor without requesting the session information of the corresponding terminal from the public data location register of the public EV-DO wireless network upon the connected call of the terminal received through the relay unit being a second or further connection call.

Preferably, the relay unit comprises a temporary identifier information generator adapted to add temporary identifier information to a call connection request signal transmitted to the call processor upon a call of the terminal entering the private EV-DO wireless network being connected, the temporary identifier information being used to determine whether a corresponding call is a connection call to be connected to the public EV-DO wireless network, or a connection call to be connected to the private EV-DO wireless network.

Preferably, the call processor comprises a routing module adapted to determine whether the corresponding terminal connection call is a private EV-DO wireless network connection call or a public EV-DO wireless network connection call, according to the temporary identifier information included in the call connection request signal transmitted from the relay unit, and to route the corresponding connection call to the private EV-DO wireless network or the public EV-DO wireless network in accordance with a result of the determination.

Preferably, the system further comprises a data packet service node adapted to provide a corresponding terminal with data through an Intranet in the private EV-DO wireless network through the call processor upon a traffic channel to the corresponding terminal being assigned from the call processor and the call being processed.

According to another aspect of the present invention, there is provided a method comprising arranging a private EV-DO wireless network including a private base station, a private control station, and a private data location register, the private EV-DO wireless network being coupled to a public EV-DO wireless network including a public data location register; transmitting a call connection request signal of the corresponding terminal to the private control station by the private base station upon a call connection request being received in the private base station from a terminal entering the private EV-DO wireless network; requesting session information of the terminal for processing a call of the corresponding terminal to the private data location register by the private control station according to a call connection request signal transmitted from the private base station; determining in the private data location register whether the session information requested from the private control station is registered in a database and determining that the session information of the corresponding terminal is the first private EV-DO wireless network connection call and requesting the session information of the corresponding terminal to a public data location register of the public EV-DO wireless network upon the session information of the corresponding terminal not being registered and receiving the session information of the corresponding terminal from the public data location register; performing private authentication of the corresponding terminal in the private data location register using the session information of the received corresponding terminal and transmitting the session information of the corresponding terminal to the private control station and storing the corresponding session information in the database; and assigning a traffic channel of the corresponding terminal according to the session information of the terminal transmitted from the private data location register and performing data service through the assigned channel with the private control station.

Preferably, in transmitting the call connection request signal to the private control station, upon the private base station transmitting a call connection request signal to the control station, the private base station transmits the call connection request signal and additionally transmits temporary identifier information used to determine whether the corresponding call is a public EV-DO wireless network connection call or a private EV-DO wireless network connection call.

Preferably, requesting the session information of the terminal to the private data location register includes analyzing temporary identifier information included in the call connection request signal transmitted from the private base station in the private control station, and selectively routing a corresponding call connection request signal to the private data location register of the public EV-DO wireless network or the private EV-DO wireless network in accordance with a result of the analysis.

Preferably, in receiving the session information of the corresponding terminal from the public data location register, upon the session information requested from the private control station being registered in the database, the private data location register determines that the call connection of the corresponding terminal is not the first call connection but a second or further connection call and provides the control station with the session information of the terminal stored in the database.

According to another aspect of the present invention, there is provided a method comprising providing a private EV-DO wireless network system coupled to a public EV-DO wireless network system including a public data location register; determining whether a call connection of a corresponding terminal is a private EV-DO wireless network connection call or a public EV-DO wireless network connection call upon a call connection being requested from a terminal entering the private EV-DO wireless network; determining whether session information for the corresponding terminal exists in a database upon a determination that the corresponding call is a private EV-DO wireless network connection call; requesting the session information of the terminal for processing a call of the corresponding terminal to a public data location register located in the public EV-DO wireless network upon a determination that the session information of the corresponding terminal does not exist in the database; performing private authentication of the corresponding terminal using authentication information included in the session information of the received corresponding terminal upon the session information of the corresponding terminal being received from the public data location register; and assigning a traffic channel of the corresponding terminal using session information of the corresponding terminal and performing data service to the terminal through the assigned channel upon the authentication of the terminal being completed after storing the session information of the corresponding terminal in the database.

Preferably, in determining whether the call connection of the corresponding terminal is the private EV-DO wireless network connection call or the public EV-DO wireless network connection call, a temporary identifier for determining whether the corresponding connection call is the private EV-DO wireless network connection call or the public EV-DO wireless network connection call is assigned to the corresponding call connection request signal, and a determination is made as to whether the corresponding connection call is the public EV-DO wireless network connection call or the private EV-DO wireless network connection call according to the assigned temporary identifier upon the call connection being requested from the terminal.

Preferably, a connection request signal for the corresponding call is routed to the control station of the public EV-DO wireless network, upon the connection call of the terminal being the public EV-DO wireless network connection call.

Preferably, determining whether the session information for the corresponding terminal exists in the database includes determining that the connection call of the corresponding terminal is a second or further connection call and assigning the traffic channel of the corresponding terminal using the session information of the corresponding terminal stored in the database and performing data service to the terminal through the assigned channel upon the session information for the corresponding terminal existing in the database.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein:

FIG. 4 is a view comparing functions of a public network DLR and a private network DLR.

DETAILED DESCRIPTION OF THE INVENTION

Hereinafter, an embodiment of a private wireless high-speed data system in accordance with the present invention and a data service method will be described in detail with reference to the accompanying drawings.

Figure 1:
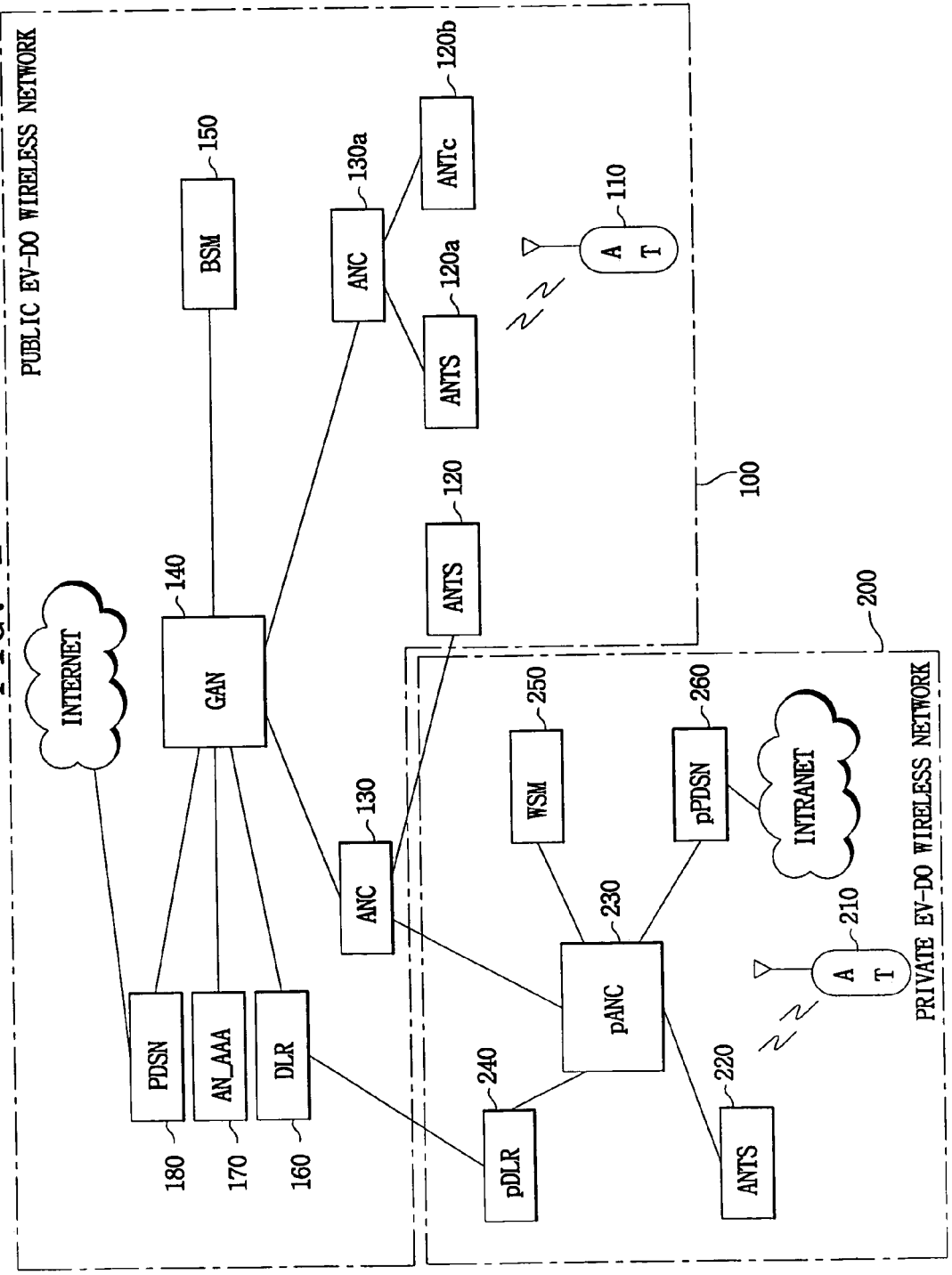
FIG. 1 is a view showing a network connection construction for a private wireless high-speed data system in accordance with an embodiment of the present invention.

FIG. 1 is a view showing a network connection construction for a private wireless high-speed data system in accordance with an embodiment of the present invention. A public EV-DO wireless network 100 and a private EV-DO wireless network 200 will be separately described in order to explain the construction and operation of the present invention.

First, as shown in FIG. 1, a terminal (AT: Access Terminal,110) of the public EV-DO wireless network 100 is a terminal which is commonly used in the public EV-DO wireless network 100 and the private EV-DO wireless network 200, and a terminal 210 of the private EV-DO wireless network 200 is commonly used in the private EV-DO wireless network 200 which is also registered in the public EV-DO wireless network 100.

Further, each of ANTSs (Access Network Transceiver System: 120, 120a, 120b: public network base station) in the public EV-DO wireless network 100 has desired public wireless areas, establishes a session when a terminal enters the areas, and performs a necessary operation when a necessary identifier (UATI : Unicast Access Terminal Identifier) is assigned to a corresponding AT 110. Also, the ANTSs 120, 120a, 120b enable a call to be received in the AT 110, or relay a call connection request signal to ANCs (Access Network Control: 130, 130a, 130b) when there is a call connection request from the AT 110.

Each of the ANCs 130 and 130a is connected to a GAN (Global Area Network, hub) 140, and the GAN is connected to AN_AAA (Access Network Authentication Accounting Authorization) 170 which handles a public network authentication, a public network terminal authentication and so on, a PDSN (Packet Data Serving Node) 180 which provides the terminal with an Internet service, a DLR (Data Location Register) 160 which stores terminal information, terminal location information and so on, and a BSM (Base System Manager) 150 which handles loading, failure, diagnosis, statistics and so on and performs a data relay between each of the nodes. Also, although the ANTSs 120, 120a, 120b of the public EV-DO wireless network 100 can be connected to the GAN 140, it is not shown in FIG. 1.

The PDSN 180 can be connected to other packet service nodes or to a p PDSN 260 of the private EV-DO wireless network 200 through an Internet.

The DLR 160 stores information on terminals 110 and 210 registered in the public EV-DO wireless network 100 and location information, and provides information on the terminals 110 and 210 when a session of the corresponding terminal is updated. Also, the DLR 160 stores information on a terminal included in a general wireless public network. The terminal information of the general wireless public network can include at least one of terminal information, user information and service grade information.

On the other hand, the ANTS 220 in the private EV-DO wireless network 200 provides the AT 210 entering the private area with an incoming call, or relays a call connection signal to pANC (Private Access Network Control) 230 when a call connection is carried out from the terminal 210.

The pANC 230 can include a router module (hub) which determines whether an outgoing data call is an originated call to be connected to the public network or an outgoing call to be connected to the private network using an identifier included in a data call originated by the AT 210, routes it to the ANC 130 of the public EV-DO wireless network 100 when the data call is a public network connection outgoing call, and routes the outgoing call in order to process a call in the private network EV-DO wireless network 200 when the outgoing call is a private network connection outgoing call.

The router module has a specific server address which has been already determined. Such server address is compared with information of a temporary identifier. And, when a call is requested to a temporary identifier terminal in which a temporary identifier address having a specific server is already determined, the call is detected as a call in the private EV-DO wireless network 200 and the corresponding call is routed to the pANC 230.

For example, a temporary identifier of the private EV-DO wireless network 200 subscriber is assigned so as to have an address of a server which has been already determined. If the determined server address is a "samsung.co.kr" or a "Samsung.com" DML server, for example, then the terminal 210 in the private EV-DO wireless network 200 can have an address of "111@samsung.co.kr".

As described above, if it is requested that the AT 210 in the private EV-OD wireless network 200 is to be connected to one of server addresses which have been determined already or a call is to be connected to a terminal having the server described above, for example, a terminal of "aaa@samsung.co.kr", then the call is determined to be a call in the private EV-DO wireless network 200.

When any server included in the temporary identifier of the AT 210 requires a call, a server which is required to receive a call, and a temporary identifier server of a terminal which is required to receive a call is not an address that has already been determined, then the corresponding call is determined to be a connection call of a public EV-DO wireless network 100 and is routed to the ANCs 130 and 130a of the public EV-DO wireless network 100.

The pANC 230 including such router module stores information on a location of a private EV-DO terminal AT 210 and other authentication and provides necessary information for processing the call when a call is connected from the private EV-DO terminal AT 210, and is connected to a pDLR 240 which performs an authentication of the private EV-DO terminal AT 210 using the stored terminal authentication information IMSI.

Further, the pANC 230 is connected to a pPDSN 260 in which the private EV-DO terminal AT 210 is provided with Internet service through an Intranet, and to a WSM 250 which takes charge of loading, failure, diagnosis and statistics of the private EV-DO wireless network 200. Network components of the private EV-DO wireless network 200 as described above are similar with those of the public EV-DO wireless network 100 in their properties and functions.

However, the pDLR 240 of the private EV-DO wireless network 200 performs a few different functions from the public network DLR 160 in order to support a private network and, especially, the pDLR 240, being the private DLR, also performs the private terminal authentication function so that separate AN_AAA equipment is not used.

An operation of the private EV-DO wireless network system interfaced to the public EV-DO network system in accordance with an embodiment of the present invention constructed as noted above is described below in detail.

First, the private EV-DO wireless network 100 is constructed by adding the pANC 230 between the public network ANTS 120 and the public network ANC 130 and network elements necessary for the EV-DO service as shown in FIG. 1.

One important function of the pANC 230 is to discriminate and transmit all kinds of messages coming from the private ANTS 220 to the public EV-DO wireless network 100 and the private EV-DO wireless network 200. The router module in the pANC 230 handles this function as described above.

For example, when the EV-DO wireless terminal AT 210 located in the private EV-DO wireless network 200 tries to have an access to the public EV-DO wireless network 100, the pANC 230 recognizes an identifier (discriminator) included in a message transmitted by the private ANTS 220, transmits the message to the public network ANC 130, and makes it possible to connect to the public EV-DO wireless network.

When the terminal AT 210 tries to connect to the private EV-DO wireless network 200, as in the public network, the pANC 230 confirms a discriminator included in a message transmitted from the private ANTS 220 and enables the pANC 230 to support the private EV-DO wireless network 200 service using a network element arranged in the premises. For reference, a discriminator to discriminate between the private EV-DO wireless network 200 and the public EV-DO wireless network 100 is provided from the EV-DO wireless terminal AT 210.

The EV-DO wireless network 200 provides the private EV-DO wireless network 200 service while maintaining a session established in the public EV-DO wireless network 100 in the private EV-DO wireless network 200, which has the following advantages.

First, the terminal AT 210 in the private EV-DO wireless network 200 can respond to a public network paging and a load increase of the public network DLR can be prevented since processing due to a subnet change does not occur.

Also, since all of tasks related with an initial session establishment are performed outside the private EV-DO wireless network 200, it is possible to embody a function of the pDLR 240 being a private DLR with ease compared with the public network DLR 160.

On constructing the pDLR 240 in the private EV-DO wireless network 200, it is possible to embody the pDLR 240 being the private DLR using a less expensive server than that of the public network DLR 160, and it is possible to use the authentication result embodied in the public network instead of a separate private AN_AAA when authenticating the private terminal AT 210.

As a result, tasks related with the session establishment and cancellation which occur in the public EV-DO wireless network 100 are not generated in the private EV-DO wireless network 200, wherein information related to the session to process a call is needed in the pDLR 240, being the private DLR, and the private pDLR 240 having a function different from that of the public network DLR 160 is applied in order to solve the call processing.

Since the private pDLR 240 does not have necessary data in its initial operation, the data may be arbitrarily inputted by a private EV-DO wireless network 100 manager. However, information in the public network DLR 160 should be used in the case of specific data. Even though the corresponding terminal AT 210 is located in the premises, the session of the AT 210 is generated by the public network DLR 160, and most information necessary for processing a call is also stored in the public network DLR 160.

Accordingly, the general private EV-DO wireless network 200 call processing is performed using the private pDLR 240, and in the case of the most necessary information, the private EV-DO call processing is performed using a method of obtaining necessary information from the public network DLR 160. As a result, in order that the private pDLR 240 requests and receives necessary data stored in the public network DLR 160, a dedicated line must be installed between the private pDLR 240 and the public network DLR 160.

When the private terminal authentication is performed using the private EV-DO wireless network 200, a problem occurs when the private EV-DO wireless network 200 service is provided by maintaining the session established in the public EV-DO wireless network 100. The problem is when the authentication task for the private terminal should be performed.

When the AT 210 is registered in the public network, there is no problem since when establishing the session of the terminal, an authentication task for the corresponding terminal is performed by the public network AN-AAA 170 after the procedure of the session establishment. However, since tasks of session establishment and cancellation are not performed in the private EV-DO wireless network 200 as described above, the task of authentication through the public AN-AAA 170 is not performed during call processing when constructing the private EV-DO wireless network 200. That is, since the authentication through the public AN-AAA 170 is performed in a new session establishment after the initial session establishment and session cancellation, it is not possible to perform the authenticating step arbitrarily in the step of connecting to the network simply.

As a result, the private EV-DO wireless network 200 must perform the authentication for the corresponding terminal, that is, a task for determining whether the corresponding terminal is an EV-DO terminal permitted in the private EV-DO wireless network 200 when the corresponding terminal is connected to the private EV-DO wireless network 200 instead of the session establishment step.

In the private EV-DO wireless network 200, information related to the session is needed in the private pDLR 240 in order to process the call, and this information is obtained from the public network DLR 160 connected by the dedicated line, wherein the private terminal AT 210 authentication is performed in the private pDLR 240 when the public network DLR 160 passes the session information to the private pDLR 240.

The session information transmitted by the public network DLR 160 has various information. When a terminal not registered in the premises tries to connect to the private EV-DO wireless network 200 using information needed for the private authentication among the various information, an authentication of the private terminal AT 210 is not permitted during call processing in order that a message of the next step is not transmitted.

The data service method of the private EV-DO wireless network system interfaced with the EV-DO wireless network system in accordance with an embodiment of the present invention corresponding to the operation described above, that is, the call processing method in the private EV-DO wireless network 200 will be explained step by step with reference to accompanying drawings.

Figure 2:
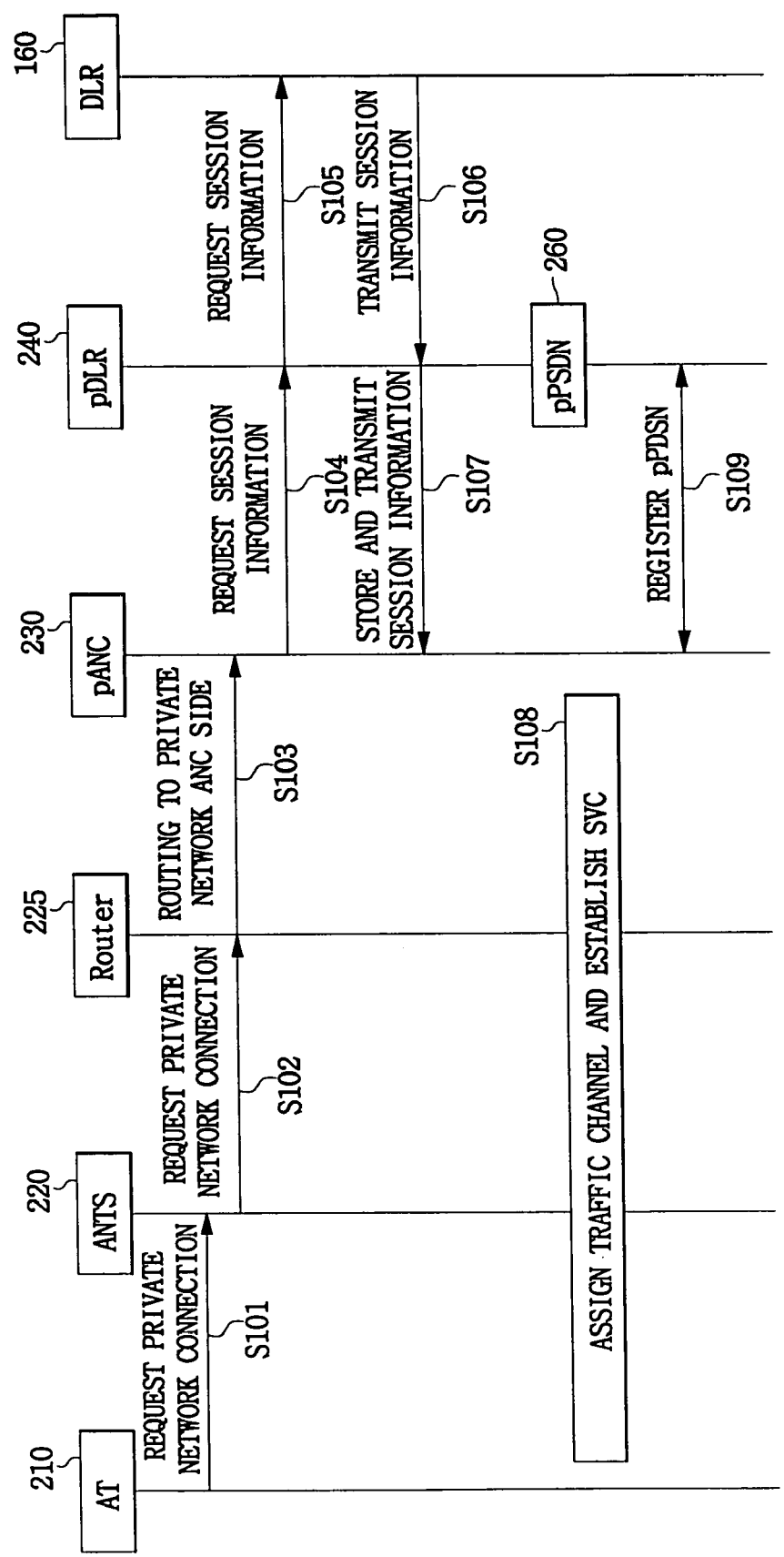
FIG. 2 is a view showing processing a call between a private network and a public network when a call is connected in the private network for the first time, in a data service method of a private wireless high-speed data system in accordance with an embodiment of the present invention.
Figure 3:
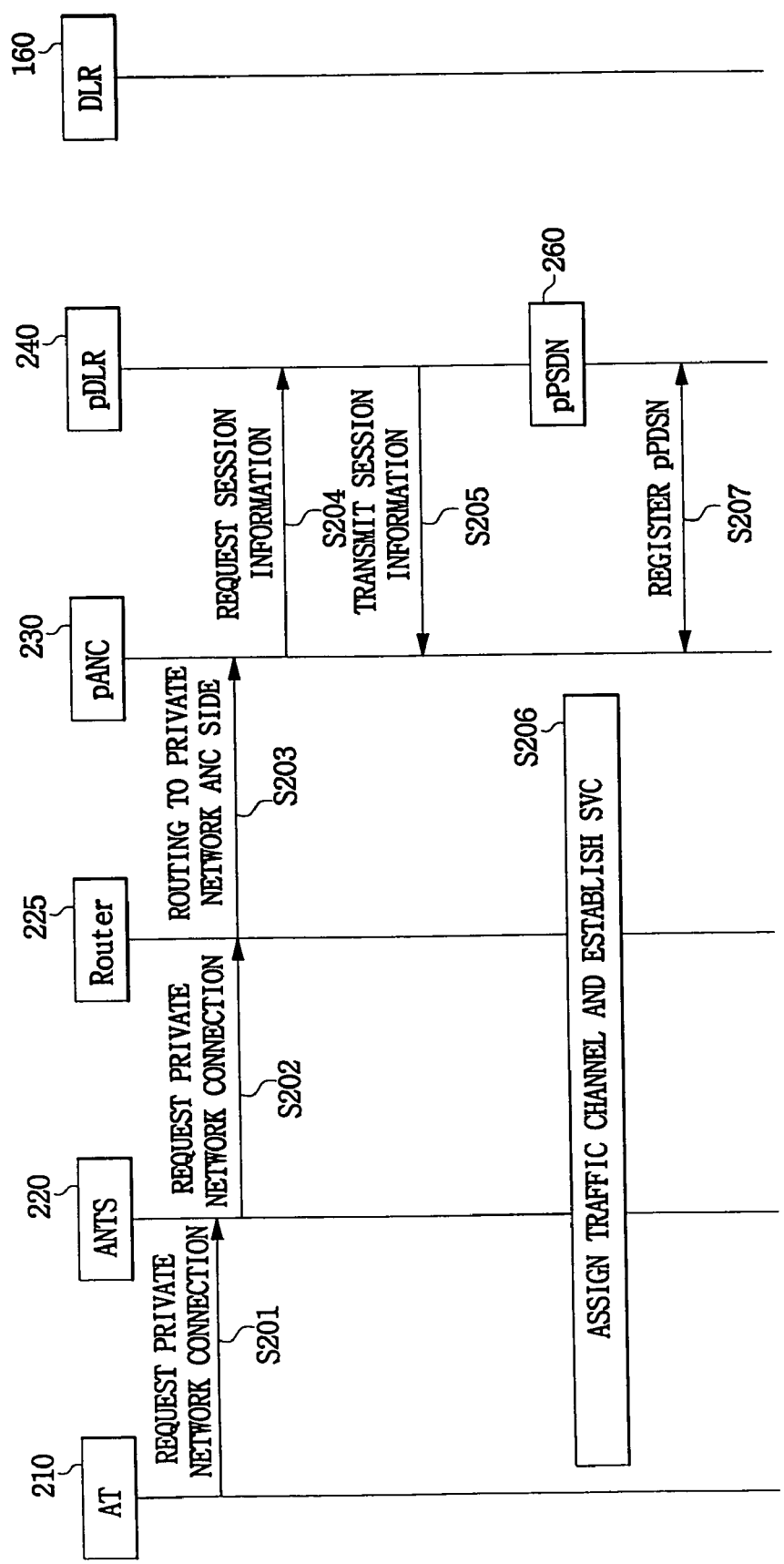
FIG. 3 is a view showing processing a call when a call is re-connected in a private network after the call processing of FIG. 2 (that is, after the first call connection in the private network)

FIG. 2 is a view showing a call processing procedure between a private EV-DO wireless network 200 and a public EV-DO wireless network 100 when the call is first connected in the private EV-DO wireless network 200, in a data service method using a private wireless high-speed data system in accordance with an embodiment of the present invention, and FIG. 3 is a view showing a call processing procedure when the call is again connected in the private EV-DO wireless network 200 after the procedure shown in FIG. 2 (after the private EV-DO wireless network connects the first call).

First, as shown in FIG. 2, when a wireless terminal AT 210 entering the private EV-DO wireless network 200 requests the first call connection to the private EV-DO wireless network 200, the wireless terminal AT 210 transmits a request signal to request a private EV-DO wireless network 200 connection to the private ANTS 220 (S101).

The private ANTS 220 routes a private network connection request signal transmitted from the AT 210 to the private pANC 230 through a router 225 (S102 and S103).

The private pNAC 230 provides the private pDLR 240 with a session information request signal to request session information necessary for a private network connection according to the private network connection request signal of the AT 210 routed by the router 225 (S104). However, when the corresponding AT 210 requests the connection for the first time, the private pDLR 240 does not store the session information for the corresponding AT 210.

In the existing DLR call processing, when the session information for the corresponding terminal does not exist in the DLR, a message that the session information does not exist is transmitted to the public ANC 130, and a procedure to open a new session starts. However, since the private EV-DO wireless network 200 should provide the private EV-DO wireless network 200 service in the state of maintaining the public network session endowed to the AT 210 without canceling it, a correction of the call processing is needed.

Accordingly, when the session information for the corresponding terminal AT 210 is not stored in a database, the private pDLR 240 transmits a session information request message received from the pANC 230 to the public network DLR 160 as is (S105).

The public network DLR 160 searches for session information of the corresponding terminal AT 210 which has requested the network connection stored in its database according to the session information request message transmitted from the private pDLR 240 and transmits the session information to the private pDLR 240 (S106).

The pDLR 240 receives the session information of the connection request terminal AT 210 received from the public network DLR 160 stores the received session information in its database, and provides the private pANC 230 with the corresponding session information (S107).

Accordingly, the private pANC 230 assigns a traffic channel to the corresponding terminal AT 210 using the session information of the connection request terminal AT 210 transmitted from the private pDLR 240 and performs a call connection to the terminal AT 210 through the assigned channel (S108).

When the call connection is performed through the assigned channel as described above, the private pANC 230 registers the corresponding terminal AT 210 in the private pPDSN 260 and performs data service through an Intranet (S109).

At this time, in step S107, the pDLR 240 can include the private authentication procedure of the corresponding terminal using the received session information. That is, the session information of the corresponding terminal AT 210 received from the public DLR 160 has many kinds of information including authentication information necessary for private authentication of the terminal. Accordingly, the pDLR 240 determines whether the corresponding terminal is registered in the private EV-DO wireless network 200 using such authentication information.

After the terminal AT 210 entering the private EV-DO wireless network 200 performs the first call connection as described above, when the call connection is again performed, the call processing procedure will be briefly explained with reference to FIG. 3.

The call processing procedure when the terminal AT 210 entering the private EV-DO wireless network 200 is again connecting a call after the first call connection is similar to that of FIG. 2 except that the call processing procedure and the authentication procedure of the terminal AT 210 are performed in the private EV-DO wireless network 200 on its own using the session information stored in the pDLR 240 of the private EV-DO wireless network 200 without requesting the session information from the public network DLR 160 since the session information of the corresponding terminal AT 210 is stored in the private pDLR 240.

Reviewing the call processing procedure step by step with reference to FIG. 3, when the wireless terminal AT 210 entering the private EV-DO wireless network 200 requests a re-connection to the private EV-DO wireless network 200, the wireless terminal AT 210 transmits a request signal to request the private EV-DO wireless network 200 connection to the private ANTS 220 (S201).

The private ANTS 220 routes the private network connection request signal transmitted from the AT 210 to the private pANC 230 through the router 225 (S202 and S203).

The private pANC 230 provides the private pDLR 240 with the session information request signal to request the session information necessary for the private network connection according to the private network connection request signal of the AT 210 routed through the router 225 (S204).

The private pDLR 240 searches for the session information of the corresponding terminal AT 210 stored in the database according to the request of the pANC 230 and performs the authentication of the corresponding terminal using the terminal authentication information included in the searched session information.

When the authentication of the corresponding terminal AT 210 is completed, that is, when the corresponding terminal AT 210 is a terminal registered in the private EV-DO wireless network 200, the searched session information of the corresponding terminal AT 210 is transmitted to the pANC 230 (S205).

Accordingly, the pANC 230 assigns a traffic channel to the corresponding terminal AT 210 using the session information of the connection request terminal AT 210 transmitted from the private pDLR 240 and performs a call connection to the terminal AT 210 through the assigned channel (S206).

When the call connection is performed through the assigned channel as described above, the private pANC 230 registers the corresponding terminal AT 210 in the private pPDSN 260 and performs data service through an Intranet (S207).

A functional difference between the pDLR 240 installed in the private EV-DO wireless network 200 and the DLR 160 installed in the public EV-DO wireless network 100 is shown in FIG. 4. FIG. 4 is a view showing functions of the public network DLR and the private network DLR.

As shown in FIG. 4, while the public DLR 160 performs a session generation and cancellation function, a UATI endowment and cancellation function, its own database maintenance function, a session maintenance confirmation function, a paging instruction transmission function, and an interfacing function with adjacent DLR, the private pDLR 240 performs only its own database maintenance function and a page transmission function.

A method for interfacing a public network and a private network in a wireless high-speed data system in accordance with an embodiment of the present invention including a call processing procedure shown in FIGS. 2 and 3 will be explained with reference to FIG. 5.

Figure 5:
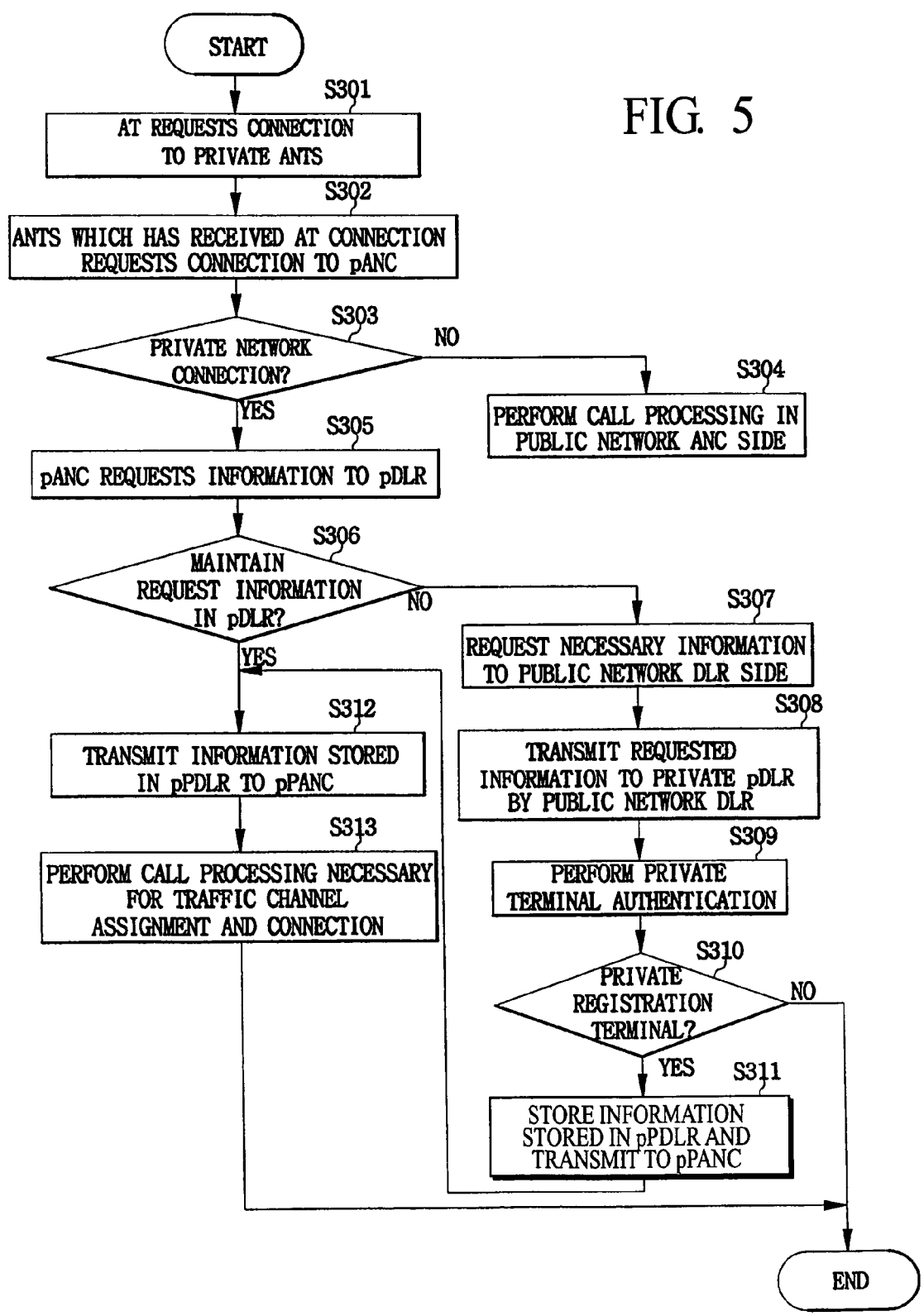
FIG. 5 is a view showing an operational flowchart of a data service method using a private wireless high-speed data system in accordance with an embodiment of the present invention.

FIG. 5 is a view showing an operational flowchart for a data service method using a private wireless high-speed data system in accordance with an embodiment of the present invention.

First, when a wireless terminal AT entering the private EV-DO wireless network requests a call connection to the private EV-DO wireless network for the first time, the wireless terminal AT transmits a request signal to request the private EV-DO wireless network connection to the private ANTS (S301).

The private ANTS routes the private network connection request signal transmitted from the AT to the private pANC through a router (S302).

The private pANC determines whether a call connection signal connected through ANTS is a call connection signal for the private EV-DO wireless network connection or a call connection signal for a public EV-DO wireless network connection (S303).

As a result of the determination, when the call connection signal is a public EV-DO wireless network connection call signal, the public EV-DO wireless network processes the corresponding call by routing the corresponding call connection request signal to the public ANC (S304).

However, when the call connection request signal of the AT is a private EV-DO wireless network connection request signal, the private pANC provides the private pDLR with the session information request signal to request session information necessary for the private network connection according to the private network connection request signal of the AT routed through the router (S305).

The private pDLR determines whether session information for a call connection request terminal AT requested from the private pANC is stored in the database (S306).

As a result of the determination, when the session information of the corresponding terminal which requested the connection to the database does not exist in the private pDLR, it is determined that a connection to the private EV-DO wireless network is being tried for the first time, and the private pDLR requests the session information of the corresponding terminal to the public DLR of the public EV-DO wireless network (S307). That is, the private pDLR requests the session information of the corresponding AT to the public DLR since the private pDLR does not have the session information for the corresponding AT when the corresponding AT requests the connection for the first time.

Next, the public network DLR searches for the session information of the corresponding terminal AT which requested the network connection stored in its database according to the session information request message transmitted from the private pDLR and transmits the session information to the private pDLR (S308).

The pDLR receives the session information of the connection request terminal AT received from the public network DLR, and performs the authentication of the corresponding AT using the terminal authentication information included in the received session information (S309).

As a result of the authentication, it is determined whether the connection request AT is the terminal registered in the private EV-DO wireless network (S310), and the authentication is not permitted and an authentication non-permission message is transmitted to the corresponding terminal when the corresponding AT is a terminal which was not registered in the private EV-DO wireless network.

However, as a result of the authentication, when the connection request AT is a terminal registered in the private EV-DO wireless network, the private pDLR stores the corresponding terminal session information transmitted from the public DLR in the database (S311), and then transmits the corresponding session information to the private pANC (S312).

Accordingly, the private pANC assigns the traffic channel with the corresponding terminal AT using the session information of the connection request terminal AT transmitted from the private pDLR and performs the call processing necessary for the connection (S313).

On the other hand, in step S306, when the session information for the call connection request terminal AT requested from the private pANC is stored in the private pDLR, that is, when the corresponding terminal performs the call connection to the private EV-DO wireless network at least two or more times, the session information of the corresponding AT stored in the database of the private pDLR is transmitted to the private pANC (S312). When the AT is initially connected to the private EV-DO wireless network, the session information for the corresponding AT is received from the public DLR and stored in the private pDLR. Therefore, when the call connection is performed afterward, the private EV-DO wireless network itself performs the call processing using the session information of the corresponding AT stored in the private pDLR, without receiving the session information of the corresponding AT from the public DLR.

As a result, the data service method using a private wireless high-speed data system in accordance with an embodiment of the present invention includes a private pDLR for handling the authentication of the private network entrance terminal and the call processing in the private (premises) EV-DO wireless network, receives the session information of the corresponding terminal from the DLR of the public EV-DO network only when the terminal entering the private EV-DO wireless network requests the first call connection, stores the session information in the database of the private pDLR, and performs the call processing and authentication. That is, in the authentication, the authentication is performed using the authentication information included in the session information of the corresponding terminal, without needing a separate AN_AAA in the private EV-DO wireless network.

When the call connection is requested from the terminal entering the private network at least two or more times, the call processing is performed using the session information for the corresponding terminal stored in the private pDLR.

A private wireless high-speed data system in accordance with an embodiment of the present invention and a data service method have an effect that unnecessary loading in a public network DLR side can be reduced according to a private EV-DO wireless network construction since after session information essential for the call processing is secured from a public network DLR when the call is connected for the first time, the following call processing can be performed by a private network DLR.

Furthermore, since the minimum function of the private DLR, that is, a function related with session establishment and cancellation is performed in the public network DLR and the only remaining function is performed in the private DLR, it is possible to use low capacity hardware when the private DLR apparatus is constructed so that a saving in the cost of materials can be obtained.

Also, since the private terminal authentication can be performed by enabling a DLR function and a terminal private authentication function to be supported simultaneously using only the private pDLR, without purchasing a separate AN_AAA server, the total material cost of the private EV-DO wireless network system can be reduced and the operating cost necessary for managing a separate server can be eliminated.

What is claimed is:

1. A system comprising:
a private EV-DO wireless network coupled to a public EV-DO wireless network including a data location register adapted to provide private EV-DO wireless data service,
a relay unit adapted to relay a corresponding call connection request signal upon the call connection request signal being received from a terminal entering the private EV-DO wireless network;
a call processor adapted to generate a session information request signal with respect to the corresponding terminal upon the call connection request signal relayed from the relay unit being a first call connection request signal, and to process a call by assigning a traffic channel to the connection terminal according to the received session information upon the session information corresponding to the requested session information request signal being received; and a session information processor adapted to request a session information request signal of the corresponding terminal generated by the call processor to a public network data location register in the public EV-DO wireless network, to store session information of the corresponding terminal received from the public network data location register, and to provide the call processor with the session information of the corresponding terminal.

2. The system according to claim 1, wherein the session information processor comprises a database adapted to store the session information of the corresponding terminal received from the public network data location register.

3. The system according to claim 1, wherein the session information of the corresponding terminal received from the public network data location comprises authentication information for authenticating the private EV-DO wireless network of the terminal.

4. The system according to claim 1, wherein the session information processor comprises an authentication unit adapted to determine whether the corresponding terminal is a terminal registered in the private EV-DO wireless network using the private EV-DO wireless network authentication information of the terminal included in the session information of the corresponding terminal received from the public network data location register.

5. The system according to claim 1, wherein the session information processor is coupled to a data location register of the public EV-DO wireless network with a dedicated line.

6. The system according to claim 1, wherein the session information processor provides the call processor with the session information of the corresponding terminal stored in the database upon the first call being connected to the database in the session information processor without requesting the session information of the corresponding terminal from the public data location register of the public EV-DO wireless network upon the connected call of the terminal received through the relay unit being a second or further connection call.

7. The system according to claim 1, wherein the relay unit comprises a temporary identifier information generator adapted to add temporary identifier information to a call connection request signal transmitted to the call processor upon a call of the terminal entering the private EV-DO wireless network being connected, the temporary identifier information being used to determine whether a corresponding call is a connection call to be connected to the public EV-DO wireless network, or a connection call to be connected to the private EV-DO wireless network.

8. The system according to claim 1, wherein the call processor comprises a routing module adapted to determine whether the corresponding terminal connection call is a private EV-DO wireless network connection call or a public EV-DO wireless network connection call, according to the temporary identifier information included in the call connection request signal transmitted from the relay unit, and to route the corresponding connection call to the private EV-DO wireless network or the public EV-DO wireless network in accordance with a result of the determination.

9. The system according to claim 1, further comprising a data packet service node adapted to provide a corresponding terminal with data through an Intranet in the private EV-DO wireless network through the call processor upon a traffic channel to the corresponding terminal being assigned from the call processor and the call being processed.

10. A method comprising:

arranging a private EV-DO wireless network including a private base station, a private control station, and a private data location register, the private EV-DO wireless network being coupled to a public EV-DO wireless network including a public data location register;

transmitting a call connection request signal of the corresponding terminal to the private control station by the private base station upon a call connection request being received in the private base station from a terminal entering the private EV-DO wireless network;

requesting session information of the terminal for processing a call of the corresponding terminal to the private data location register by the private control station according to a call connection request signal transmitted from the private base station;

determining in the private data location register whether the session information requested from the private control station is registered in a database and determining that the session information of the corresponding terminal is the first private EV-DO wireless network connection call and requesting the session information of the corresponding terminal to a public data location register of the public EV-DO wireless network upon the session information of the corresponding terminal not being registered and receiving the session information of the corresponding terminal from the public data location register;

performing private authentication of the corresponding terminal in the private data location register using the session information of the received corresponding terminal and transmitting the session information of the corresponding terminal to the private control station and storing the corresponding session information in the database; and assigning a traffic channel of the corresponding terminal according to the session information of the terminal transmitted from the private data location register and performing data service through the assigned channel with the private control station.

11. The method according to claim 10, wherein, in transmitting the call connection request signal to the private control station, upon the private base station transmitting a call connection request signal to the control station, the private base station transmits the call connection request signal and additionally transmits temporary identifier information used to determine whether the corresponding call is a public EV-DO wireless network connection call or a private EV-DO wireless network connection call.

12. The method according to claim 10, wherein requesting the session information of the terminal to the private data location register includes analyzing temporary identifier information included in the call connection request signal transmitted from the private base station in the private control station, and selectively routing a corresponding call connection request signal to the private data location register of the public EV-DO wireless network or the private EV-DO wireless network in accordance with a result of the analysis.

13. The method according to claim 10, wherein, in receiving the session information of the corresponding terminal from the public data location register, upon the session information requested from the private control station being registered in the database, the private data location register determines that the call connection of the corresponding terminal is not the first call connection but a second or further connection call and provides the control station with the session information of the terminal stored in the database.

14. A method comprising:

providing a private EV-DO wireless network system coupled to a public EV-DO wireless network system including a public data location register;

determining whether a call connection of a corresponding terminal is a private EV-DO wireless network connection call or a public EV-DO wireless network connection call upon a call connection being requested from a terminal entering the private EV-DO wireless network;

determining whether session information for the corresponding terminal exists in a database upon a determination that the corresponding call is a private EV-DO wireless network connection call;

requesting the session information of the terminal for processing a call of the corresponding terminal to a public data location register located in the public EV-DO wireless network upon a determination that the session information of the corresponding terminal does not exist in the database;

performing private authentication of the corresponding terminal using authentication information included in the session information of the received corresponding terminal upon the session information of the corresponding terminal being received from the public data location register; and assigning a traffic channel of the corresponding terminal using session information of the corresponding terminal and performing data service to the terminal through the assigned channel upon the authentication of the terminal being completed after storing the session information of the corresponding terminal in the database.

15. The method according to claim 14, wherein, in determining whether the call connection of the corresponding terminal is the private EV-DO wireless network connection call or the public EV-DO wireless network connection call, a temporary identifier for determining whether the corresponding connection call is the private EV-DO wireless network connection call or the public EV-DO wireless network connection call is assigned to the corresponding call connection request signal, and a determination is made as to whether the corresponding connection call is the public EV-DO wireless network connection call or the private EV-DO wireless network connection call according to the assigned temporary identifier upon the call connection being requested from the terminal.

16. The method according to claim 15, wherein a connection request signal for the corresponding call is routed to the control station of the public EV-DO wireless network, upon the connection call of the terminal being the public EV-DO wireless network connection call.

17. The method according to claim 14, wherein determining whether the session information for the corresponding terminal exists in the database includes determining that the connection call of the corresponding terminal is a second or further connection call and assigning the traffic channel of the corresponding terminal using the session information of the corresponding terminal stored in the database and performing data service to the terminal through the assigned channel upon the session information for the corresponding terminal existing in the database.

* * * * *